UNITED STATES PATENT OFFICE.

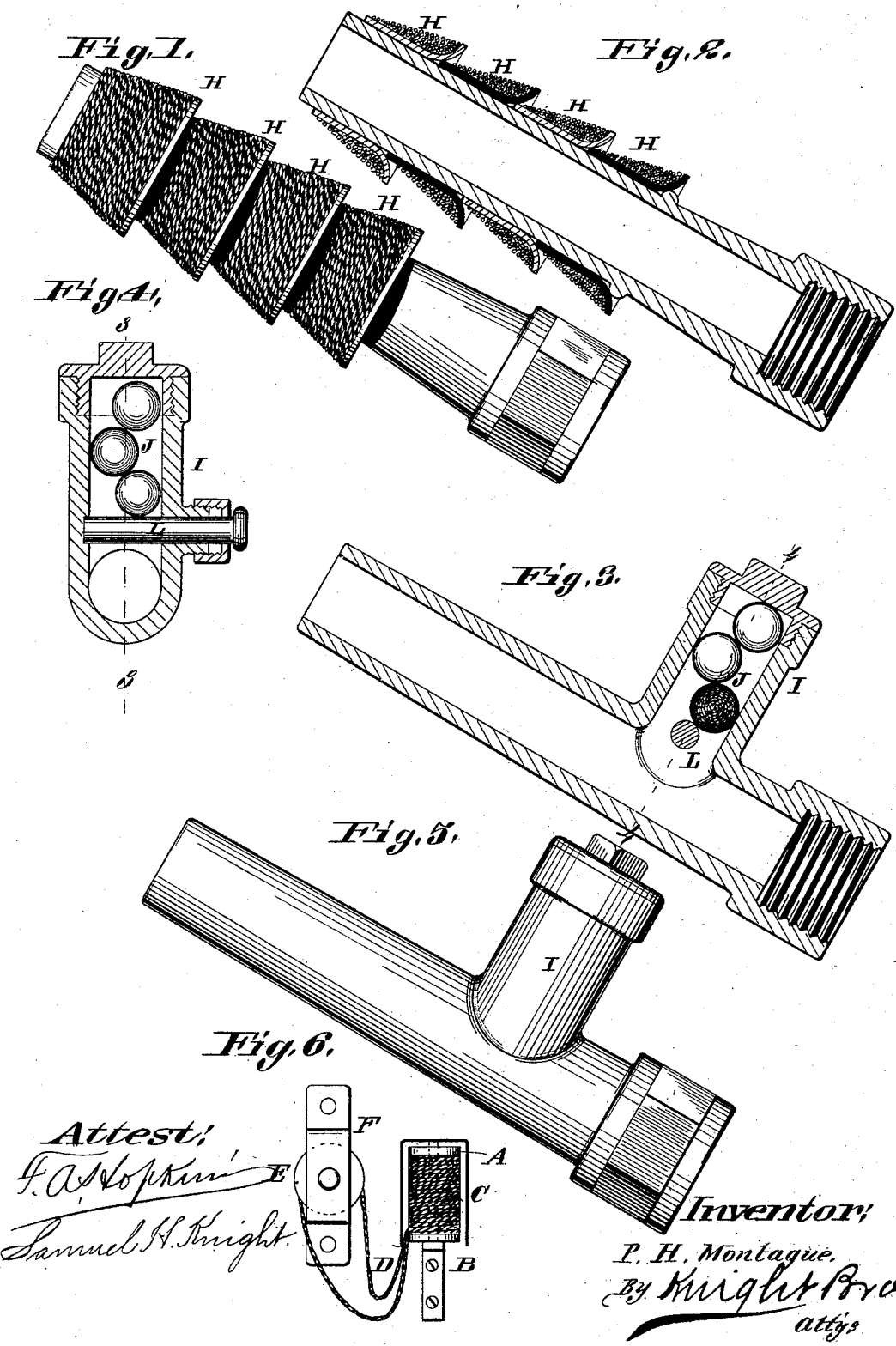

PATRICK H. MONTAGUE, OF ST. LOUIS, MISSOURI, ASSIGNOR OF ONE-FOURTH TO THOMAS F. McDERMOTT, OF SAME PLACE.

FIRE-ESCAPE.

SPECIFICATION forming part of Letters Patent No. 328,331, dated October 13, 1885.

Application filed September 3, 1885. Serial No. 176,104. (No model.)

*To all whom it may concern:*

Be it known that I, PATRICK H. MONTAGUE, of the city of St. Louis, in the State of Missouri, have invented a certain new and useful Improvement in Fire-Escapes, of which the following is a full, clear, and exact description, reference being had to the accompanying drawings, forming part of this specification, and in which—

Figure 1 is a side view of a hose-nozzle with a number of spools thereon. Fig. 2 is a longitudinal section of same. Fig. 3 is a longitudinal section of a hose, showing another form or means of getting the wire into the building. The section is taken on line 3 3, Fig. 4. Fig. 4 is a transverse section taken on line 4 4, Fig. 3. Fig. 5 is a side elevation of the form shown in Figs. 3 and 4. Fig. 6 illustrates the spool and pulley-block part of my invention.

My invention relates to a fire-escape consisting of a spool containing a wire or cord which is supported by the window-jamb or other part of the building, and which may be thrown from its support by the water from a fire-hose, or by any missile, the cord of the spool passing around a pulley, which is also secured to the window-jamb or other part of the building, and being of sufficient length to allow the spool, when removed from its support, to fall to the ground, and a double cord will thus extend from the window or other part of the building to the ground over a pulley, which enables a larger cord or rope to be pulled up to afford means of escape from a building, or to elevate the hose, if desired; and my invention consists in features of novelty hereinafter fully described, and pointed out in the claims.

Referring to the drawings, A represents a spool supported on a bracket, B, which is secured to the window-jamb or other part of the building. The bracket consists, preferably, of a simple pin over which the spool slips. When the spool is in place, it may be covered by a shield, C, to protect it from moisture or rain, and prevent the wire, if it is metal, from becoming rusted, or, if it is fiber, to prevent it from rotting.

D represents the cord, which passes through a pulley, E, supported by a block, F, which secures it to the window-jamb or other part of the building. From the pulley the cord or rope winds around the spool, and it will be understood that when the spool is removed from its support it will fall downward by gravity to the ground, thus giving a double cord from the point where the pulley is located to the ground, where it can be reached, and where a larger rope or a fire-hose may be connected to one end, and by pulling on the one end of this small rope or cord the other rope or fire-hose can be elevated to the pulley within reach of persons in the building. This rope, as before intimated, may be made of fibrous material or of metal, as desired.

The spool may be removed from its support by any suitable means, or it may be taken off by a person in the building and dropped to the ground.

As a means of removing it from its support by a person on the ground, I have shown the nozzle of a fire-hose provided with missiles in the form shown in Figs. 1 and 2. These consist of thimbles H, which slip over the outside of the nozzle, and which when the water is turned on may be pushed up off the end of the nozzle, and will then be carried up with the water to the spool, and by striking the spool will remove it from its support. I prefer to wrap these thimbles with wire or cord to give them weight, and also to afford means (if the thimble should enter the building) for a person to lower a cord or wire by unwrapping it from the spool to the ground, thus giving additional connection between the person in the building and those on the ground.

In Figs. 3 and 4 I have shown the nozzle provided with a hollow extension, I, in which are placed a number of balls, J, having wire or cord coiled within them. They are held within the extension until used by a transverse pin, L. By pulling outward on the pin when the water is turned on the balls will fall down into the body of the nozzle, and will be carried outward and upward with the water, and will act the same as the thimbles just mentioned to remove the spool from its support, and to give additional connection between the person in the building (if they enter the building) and the persons on the ground.

In some cases the water directed alone against the spool might be sufficient to dislodge the spool from its support, and, on the other hand, water is not necessarily used at all, but any missile thrown against the spool could be employed to remove it from its support.

I claim as my invention—

1. The combination of a spool suitably supported, a pulley suitably supported, and a cord or rope passing around the pulley and wound upon the spool, substantially as and for the purpose set forth.

2. The combination of the spool, cord wound around the spool, and pulley or support over which the rope passes, substantially as and for the purpose set forth.

3. The combination of the spool suitably supported, shield covering the spool, wire or rope wound around the spool, and pulley or other support over which the rope passes, substantially as and for the purpose set forth.

4. The combination of the spool, bracket supporting the spool, shield covering the spool and supported by the bracket, pulley-block supporting the pulley, and cord or rope passing around the pulley and wound upon the spool, substantially as and for the purpose set forth.

5. The combination of the spool suitably supported, cord or rope wound upon the spool, pulley or other support around which the rope passes, and means, substantially as described, for removing the spool from its support, as and for the purpose set forth.

6. The combination of the spool suitably supported, pulley, cord or rope passing around the pulley and wound upon the spool, and hose-nozzle provided with ropes or cords wrapped upon supports, and operating substantially as shown and described, for the purpose set forth.

PATRICK H. MONTAGUE.

In presence of—
GEO. H. KNIGHT,
BENJN. A. KNIGHT.